United States Patent [19]
Imai et al.

[11] Patent Number: 5,174,521
[45] Date of Patent: Dec. 29, 1992

[54] PRELOADER

[75] Inventors: Keisuke Imai; Akio Numazawa; Fuminori Teraoka, all of Aichi, Japan

[73] Assignee: Kabushiki Kaisha Tokai-Rika-Denki-Seisakusho, Aichi, Japan

[21] Appl. No.: 726,961

[22] Filed: Jul. 8, 1991

[30] Foreign Application Priority Data

Jul. 13, 1990 [JP] Japan .................. 2-74775

[51] Int. Cl.⁵ .......................... B65H 75/48
[52] U.S. Cl. ........................... 242/107
[58] Field of Search ......... 242/107, 107.3, 107.4 R, 242/107.9 A, 107.4 B, 107.4 C, 107.4 D, 107.4 E, 107.5; 280/806, 807, 808

[56] References Cited

U.S. PATENT DOCUMENTS

| 4,423,846 | 1/1984 | Föhl | 242/107 |
| 4,455,000 | 6/1984 | Nilsson | 242/107 X |
| 4,597,544 | 7/1986 | Föhl | 242/107.4 B |
| 4,618,108 | 10/1986 | Butenop et al. | 242/107 |
| 4,750,685 | 6/1988 | Frei | 242/107.4 R X |
| 4,925,123 | 5/1990 | Frei et al. | 242/107 |
| 4,932,603 | 6/1990 | Yamaroi et al. | 242/107 |
| 4,979,694 | 12/1990 | Grabinski et al. | 242/107 |
| 5,098,030 | 3/1992 | Kosugi | 242/107 |

FOREIGN PATENT DOCUMENTS 5995068 5/1984 Japan.
290174 7/1990 Japan.
2100967 8/1990 Japan.
2256549 10/1990 Japan.

Primary Examiner—Daniel P. Stodola
Assistant Examiner—John P. Darling
Attorney, Agent, or Firm—Sixbey, Friedman, Leedom & Ferguson

[57] ABSTRACT

A preloader for use in a webbing retractor for retracting an occupant-restraining webbing onto a takeup shaft so as to allow the webbing to be applied to the occupant with appropriate tightness. A rotating drum disposed coaxially with the takeup shaft has an annular groove. A wedge member is held around the rotating drum at a certain distance from the rotating drum by a shear pin. A wire is wound in advance around the outer periphery of the wedge member. At the time of a sudden deceleration of a vehicle a driving force is applied to the wire, and the wire in turn tightens the wedge member by being more tightly wound therearound. The shear pin is broken by the tight winding by the wire, and the wedge member is wedge-fitted to the rotating drum, so that the wedge member and the rotating drum rotate integrally and cause the takeup shaft to rotate.

30 Claims, 6 Drawing Sheets

PRELOADER

BACKGROUND OF THE INVENTION

1. Field of the Invention

The present invention relates to a preloader for use in a webbing retractor and adapted to allow a webbing to be applied to a vehicle occupant with appropriate tightness at the time of a sudden deceleration of a vehicle.

2. Description of the Related Art

A seat belt apparatus ensures the safety of an occupant by restraining the occupant with appropriate tightness by means of a webbing at the time of a sudden deceleration of a vehicle.

For this reason, preloaders have been proposed for allowing a webbing to be applied closely around the occupant by forcibly pulling the webbing in the direction of retraction.

These preloaders are so arranged as to allow the webbing to be retracted and paid out freely without hampering the rotation of a takeup shaft, during the normal running of the vehicle. At the time of a sudden deceleration of the vehicle, however, the retracting torque of the preloader is transmitted to the takeup shaft by means of a clutch mechanism interposed between the webbing takeup shaft and the preloader, thereby allowing the webbing to be taken up in the direction in which the occupant is restrained.

As for the structure of such a clutch mechanism, the following structures are conventionally known: one in which a latch member (pawl or the like) is meshed with a ratchet gear so as to transmit the retracting torque of the preloader to the takeup shaft (Japanese Patent Application Laid-Open No. 57-128169 etc.), and another in which a wire is wound with play around a rotating drum provided integrally with the takeup shaft, and the rotating drum is rotated by means of a frictional force occurring during tight winding so as to transmit the retracting torque of the preloader to the takeup shaft (Japanese Patent Application Laid-Open No. 59-95068 etc.).

With the clutch mechanism using the latch member (pawl or the like) and the ratchet gear, however, there is a drawback in that in the case of a large torque acting on the latch member, there are instances in which a portion of the latch member engaging with the ratchet gear becomes broken. Meanwhile, with the mechanism in which the rotating drum is rotated by means of frictional force occurring during tight winding, there is a drawback in that the wire can loosen and slip over the peripheral surface of the rotating drum, making it difficult to impart sufficient torque to the rotating drum.

SUMMARY OF THE INVENTION

In view of the above-described circumstances, it is an object of the present invention to provide a preloader capable of transmitting a required and sufficient tight-winding tensile force of a wire, to a rotating drum, without using a clutch means comprising a latch member and a ratchet gear.

To this end, in accordance with the present invention, there is provided a preloader for use in a webbing retractor for retracting an occupant-restraining webbing onto a takeup shaft so as to allow the webbing to be applied to the occupant with appropriate tightness, wherein a rotating drum is connected to the takeup shaft and has an annular groove whose width becomes gradually smaller from the outer periphery toward the axis of the rotating drum. A wedge member is held around the rotating drum at a certain distance from the rotating drum by a holding member in such a manner as to be capable of being wedge-fitted to the rotating drum. The holding member holds the wedge member until a predetermined load is applied thereto. A flexible elongated member is wound in advance around the outer periphery of the wedge member, and one end of the flexible elongated member is connected to driving means in such a manner that a driving force is imparted thereto in the direction of the axis of the rotating drum so as to cause the wedge member to be tightened by the flexible elongated member. As the driving force is imparted to the flexible elongated member from the driving means, and the wedge member is thereby tightened by the flexible elongated member which is tightened therearound, a load is also applied to the holding member and the holding member undergoes rupture. This, in turn, cancels the holding of the holding member, thereby causing the wedge member to be wedge-fitted to the rotating drum. The wedge member and the rotating drum thus wedge-fitted rotate integrally in a webbing taking-up direction, so that the takeup shaft also rotates in the webbing taking-up direction.

In accordance with the present invention which is thus arranged, in a state of a sudden deceleration of the vehicle, the driving means is actuated, the wedge member is tightened by the flexible elongated member wound thereround, and upon rupture of the holding member, the wedge member is wedge-fitted to the annular groove in the rotating drum, allowing the wedge member and the rotating drum to rotate as a unit in the webbing taking-up direction. Accordingly, the flexible elongated member is prevented from loosening and slipping on the drum, and it is possible to transmit the retracting force of the preloader positively to the takeup shaft. Furthermore, since the clutch mechanism does not use a latch member and a ratchet member, there is no fear of the tooth of the latch member becoming broken.

The above and other objects, features and advantages of the present invention will become more apparent from the following description of the invention when read in conjunction with the accompanying drawings.

DESCRIPTION OF THE PREFERRED EMBODIMENTS

Figure 1:
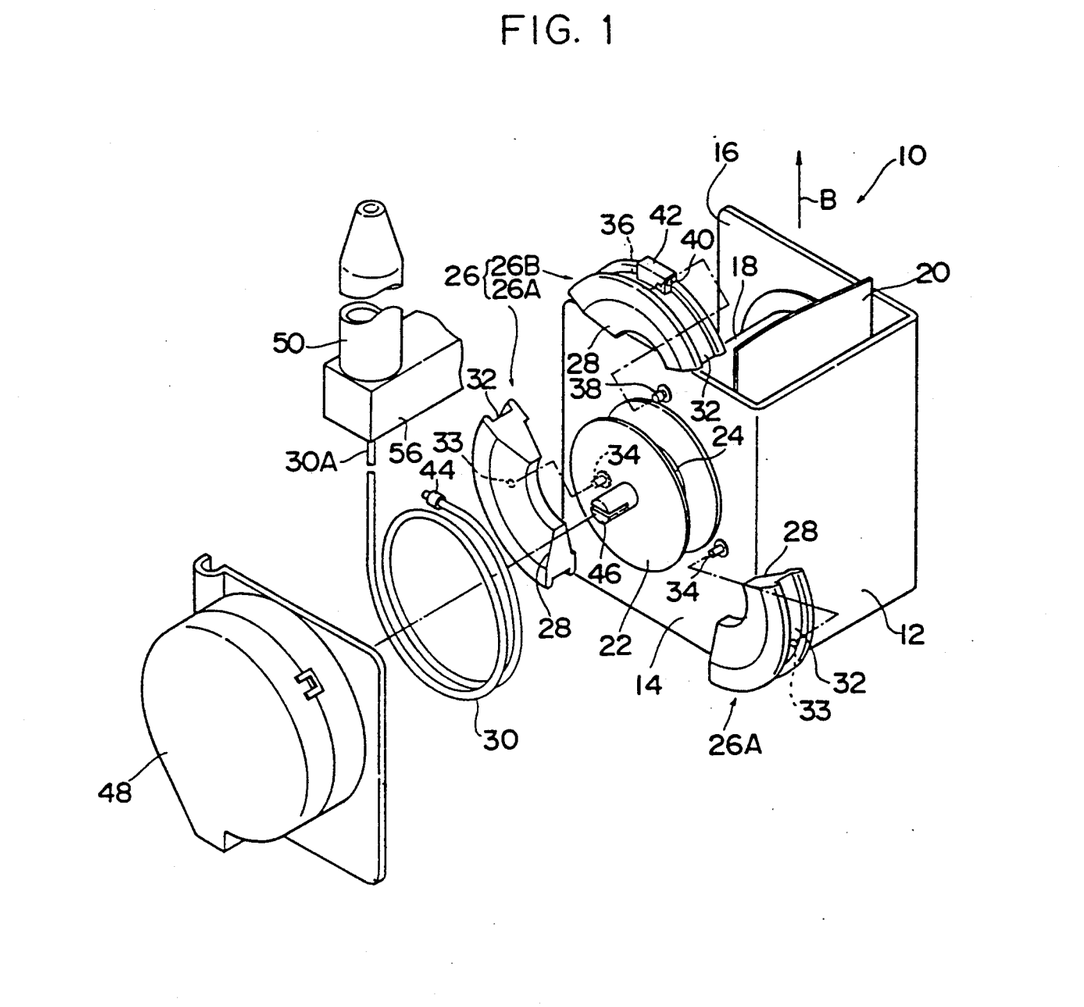
FIG. 1 is an exploded perspective view of a preloader in accordance with a first embodiment of the present invention.

FIG. 1 shows a first embodiment of a preloader in accordance with the present invention.

A webbing retractor 10 in this first embodiment has a frame which is constituted by a plate 12 secured to a center pillar of a vehicle and a pair of tabular leg plates 14, 16 extending orthogonally from opposite sides of the plate 12, in parallel with each other.

The leg plates 14, 16 rotatably support a takeup shaft 18; the end of a webbing 20 for being applied around an occupant is retained at the takeup shaft 18, and the webbing 20 is wound around the takeup shaft 18 in the form of a roll.

A rotating drum 22 is formed integrally with an end portion of the takeup shaft 18 on the outer side of the leg plate 14. The rotating drum 22 has a disk-shaped configuration, and an annular groove 24 having a smaller width toward the axis of the rotating drum 22 is formed around the outer periphery of the rotating drum 22 at an axially central portion thereof.

Figure 2:
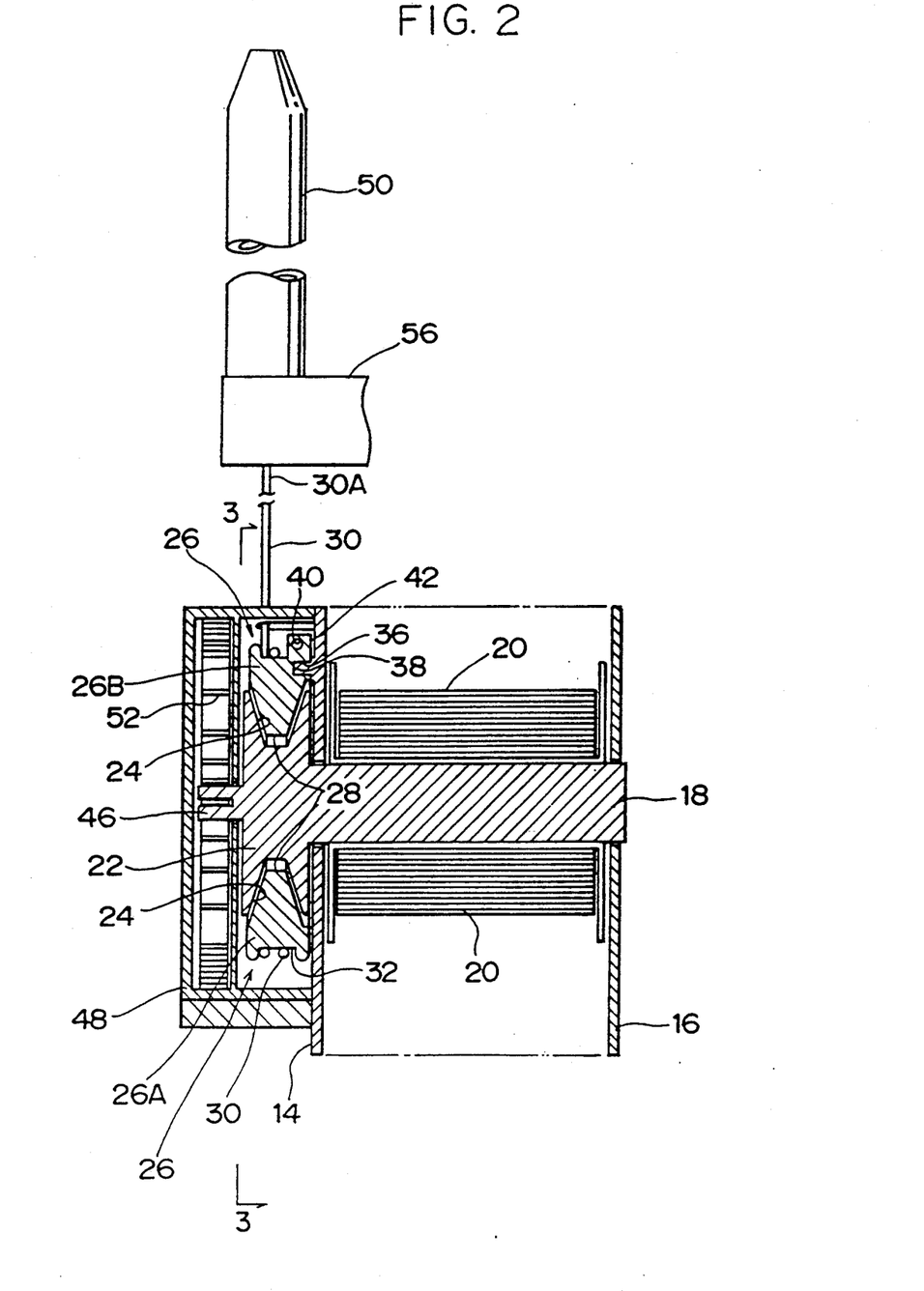
FIG. 2 is a cross-sectional view of a clutch mechanism of the preloader in a normal running state of a vehicle.

To give a more detailed description, in a cross-sectional view taken along the axis of the rotating drum 22, as shown in FIG. 2, the annular groove 24 has a trapezoidal cross section, and a wedge assembly 26 is adapted to be fitted thereto. This wedge assembly 26 comprises a pair of arcuate wedge pieces 26A and an arcuate wedge piece 26B which are formed by radially cutting an annular member into three segments or sectors. The annular member includes as an inner peripheral portion a protrusion 28 having a trapezoidal cross section and adapted to be fitted to the annular groove 24, and as an outer peripheral portion a winding portion 32 having an annular groove around which a wire 30 is wound.

A circular hole 33 is formed in a side surface of each wedge piece 26A facing the leg plate 14, and a shear pin 34 projecting from the leg plate 14 is fitted into the circular hole 33. Each wedge piece 26A is disposed around the outer periphery of the annular groove 24 at a position where the protrusion 28 thereof does not abut against the peripheral surface walls of the annular groove 24 of the rotating drum 22, and in this state the wedge piece 26A is secured to the leg plate 14.

Meanwhile, the wedge piece 26B is similarly provided with a circular hole 36 in a side surface thereof opposing the leg plate 14, and a shear pin 38 disposed on the leg plate 14 is fitted therein. This shear pin 38 has a greater diameter than that of the shear pins 34 fitted in the respective wedge piece 26A, so that its shear resistance is larger than that of the latter two shear pins 34.

The wire 30 for transmitting the driving force of a driving mean is wound around the winding portion 32 disposed around the outer peripheral portion of the wedge assembly 26. One end portion of the wire 30 is inserted into a retaining portion 42 formed on the outer peripheral portion of the wedge piece 26B and having an inserting hole 40 in the circumferential direction, and is secured to the wedge piece 26B by means of a piece 44.

Accordingly, when a predetermined tensile force acts on the wire 30, the wedge pieces 26A and the wedge piece 26B are tightened by the wire 30 wound therearound, and the shear pins 34 and the shear pin 38 are consecutively sheared, so that the wedge pieces 26A and the wedge piece 26B are rotated integrally with the rotating drum 22 in the webbing taking-up direction.

Meanwhile, the other end portion 30A of the wire 30 is connected to an unillustrated piston accommodated in a cylinder 50 serving as the driving means, as shown in FIGS. 1 and 2.

A gas generator 56 is attached to the cylinder 50. A gas generating agent (enhancer or the like) and a detonator, although not shown, are accommodated in the gas generator 56. When the state of a sudden deceleration of the vehicle is detected by an acceleration sensor, the detonator is fired, and the gas generating agent is caused to react by a spark, thereby producing a large amount of gas. The gas thus generated is guided into the cylinder 50 via a communicating passage, and pushes the piston sharply upward as viewed in the drawing.

In addition, a boss 46 is formed at a central portion of a distal end surface of the rotating drum 22, and this boss 46 is retained by an inner end portion of a spiral spring 52 accommodated in a spring case 48. An outer end of the spiral spring 52 is retained by the spring case 48, and the spring case 48 is secured to the leg plate 14.

As a result, the takeup shaft 18 is urged by the spiral spring 52 in the webbing taking-up direction via the rotating drum 22 so as to take up the webbing 20. It should be noted that the arrangement provided is such that the occupant is capable of applying the webbing 20 around him or her by pulling out the webbing 20 in the direction of arrow B in FIG. 1 against the urging force of the spiral spring 52.

Furthermore, the webbing retractor is also provided with an acceleration sensor for detecting the state of a sudden deceleration of the vehicle as well as a lock mechanism for instantaneously preventing the rotation of the takeup shaft 18 in the webbing paying-out direction upon actuation of the acceleration sensor.

A description will be given hereinunder of the operation of the first embodiment constructed as described above.

Figure 3:
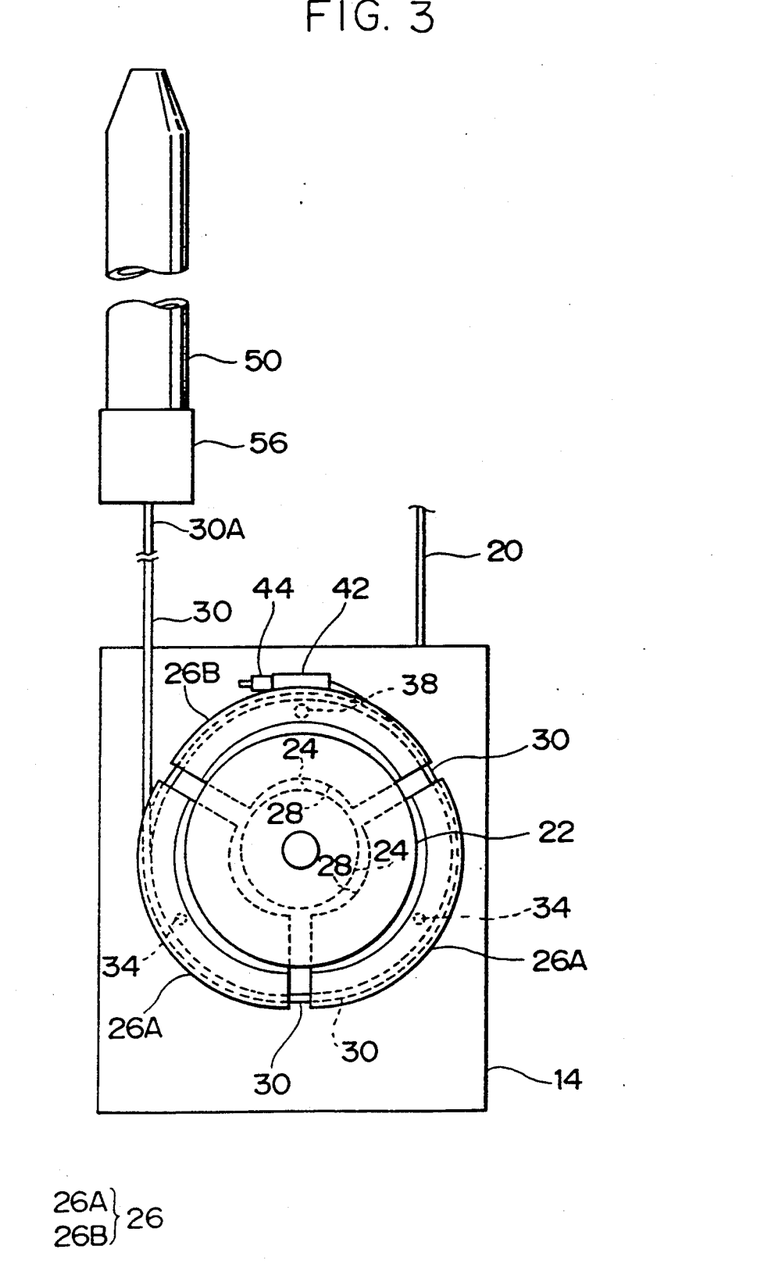
FIG. 3 is a cross-sectional view, taken along line 3—3 of FIG. 2, of the clutch mechanism of the preloader in the normal running state of the vehicle.

As shown in FIG. 3, in the normal running state of the vehicle, since the wire 30 is not tightly wound around the wedge assembly 26, the wedge assembly 26 is secured to the leg plate 14 in a state in which the trapezoidal protrusions 28 do not abut against the annular groove 24 of the rotating drum 22. Accordingly, the takeup shaft 18 is capable of rotating freely in either the webbing taking-up direction or the paying-out direction without being restricted by the rotating drum 22.

Accordingly, since the webbing 20 is thus capable of being retracted or paid out freely with respect to the takeup shaft 18 by following a change in the posture of the occupant, the webbing 20 does not restrict the occupant in the normal running state of the vehicle.

However, at the time of a sudden deceleration of the vehicle (in the event that an acceleration of 10G or thereabouts has acted), the acceleration sensor reacts, whereupon the unillustrated detonator is fired and its spark causes the gas generating agent to react, thereby generating a large amount of gas. The gas thus generated is guided into the cylinder 50, and pushes the piston sharply upward. Hence, the wire 30 connected to the piston is instantaneously subjected to a tensile force.

When the wire 30 is thus pulled upward, a tensile force is produced since the other end of the wire 30 is secured to the wedge piece 26B by means of the retaining portion 42. Consequently, the wire 30 tightens the wedge pieces 26A and the wedge piece 26B by being tightened therearound by the tensile force.

Figure 4:
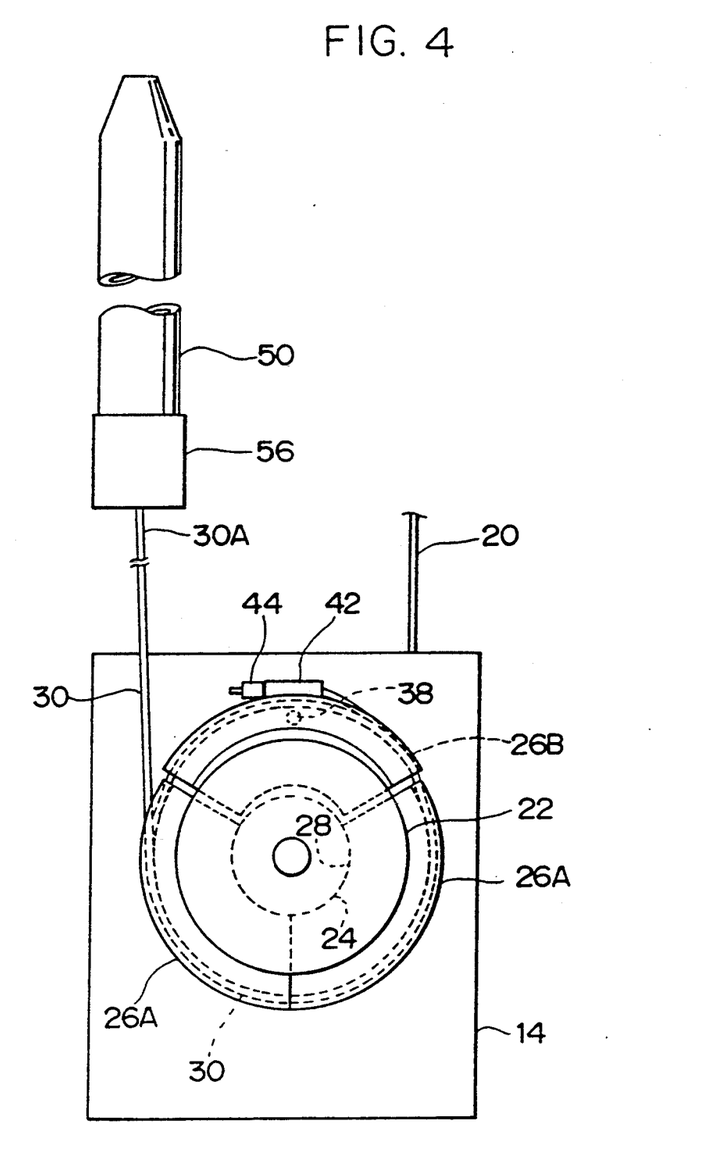
FIG. 4 is a cross-sectional view, taken along line 3—3 of FIG. 2, of a state before a rotating drum is rotated in a webbing taking-up direction in a state of a sudden deceleration of the vehicle.

As shown in FIG. 4, the respective shear pins 34 of the wedge pieces 26A are sheared by the tight winding force of the wire 30. so that the trapezoidal protrusions 28 of the wedge pieces 26A are fitted to the annular groove of the rotating drum 22. thereby imparting torque to the rotating drum 22. At this juncture, as shown in FIG. 4. since the shear resistance of the shear pin 38 fitted in the wedge piece 26B is greater than that of the shear pins 34. the shear pin 38 is not sheared. so that the wedge piece 26B remains secured to the leg plate 14. Accordingly, the wedge piece 26B abuts against the wedge pieces 26A and prevents the rotation of the wedge pieces 26A in the taking-up direction, with the result that the rotating drum 22 does not rotate.

It should be noted that since the protrusions 28 and the annular groove 24 are respectively formed with a trapezoidal cross section, they have large frictional surfaces at the time when they are fitted to each other, so that the protrusions 28 are prevented from slipping inside the annular groove 24 unexpectedly.

Figure 5:
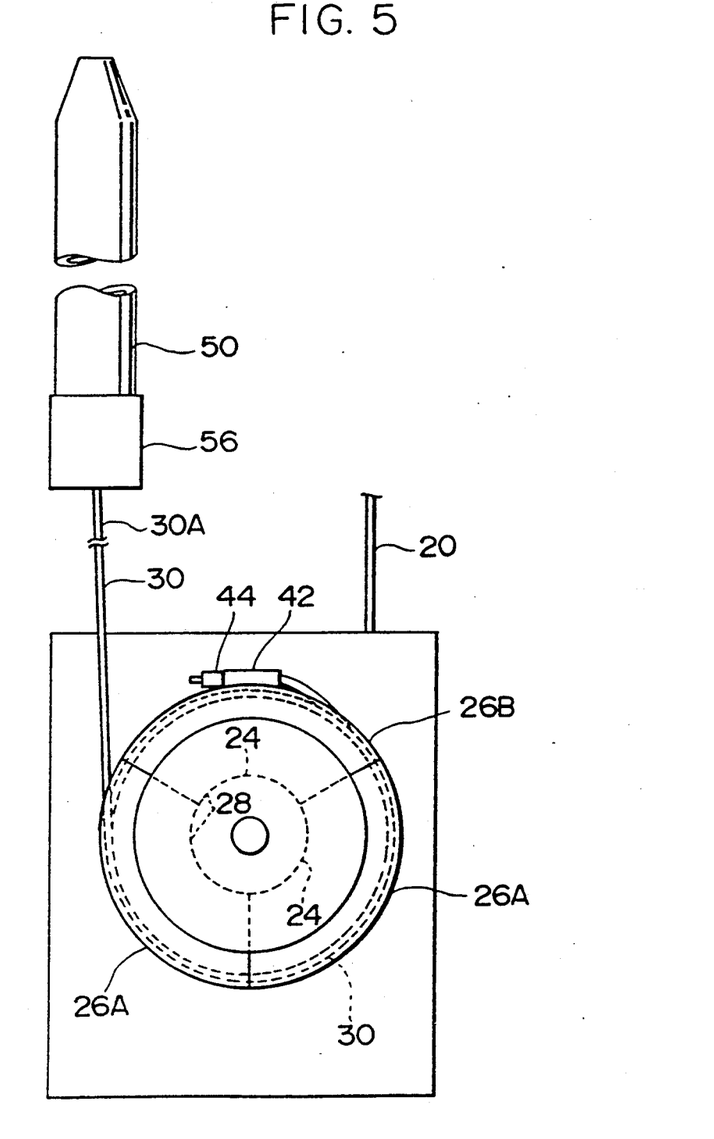
FIG. 5 a cross-sectional view, taken along line 3—3 of FIG. 2, of a state in which the rotating drum has been rotated in the webbing taking-up direction in the state of a sudden deceleration of the vehicle.

At this juncture, as shown in FIG. 5, when a further tensile force acts on the wire 30, the shear pin 38 fitted in the wedge piece 26B is sheared by the tight winding force of the wire 30, and the protrusion 28 of the wedge piece 26B is fitted to the annular groove 24 of the rotating drum 22. At the same time, the rotating drum 22 starts to rotate the wedge pieces 26A and the wedge piece 26B as a unit.

The shear pin 38 is thus provided with a slight time lag in shear rupture with respect to the sheer pins 34, due to the tight winding force of the wire 30. Only after the protrusions 28 of the wedge pieces 26A have been fitted sufficiently to the annular grooves 24, is the shear pin 38 sheared. and only after that does the rotating drum 22 start to rotate. Hence, the wire 30 is prevented from loosening or slipping. so that it is possible to transmit the tensile force positively to the rotating drum 22.

Consequently. the takeup shaft 18 formed integrally with the rotating drum 22 rotates in the webbing taking-up direction. allowing the webbing 20 to be applied closely around the occupant.

Also, the webbing 20 tends to be pulled out of the webbing retractor by means of the occupant's inertial movement. by the unillustrated lock mechanism for instantaneously preventing the rotation of the takeup shaft 18 in the webbing paying-out direction is actuated, so that the takeup shaft 18 is prevented from rotating in the webbing paying-out direction. As a result, the occupant is restrained positively in the state in which the webbing is applied closely around him or her.

Figure 6:
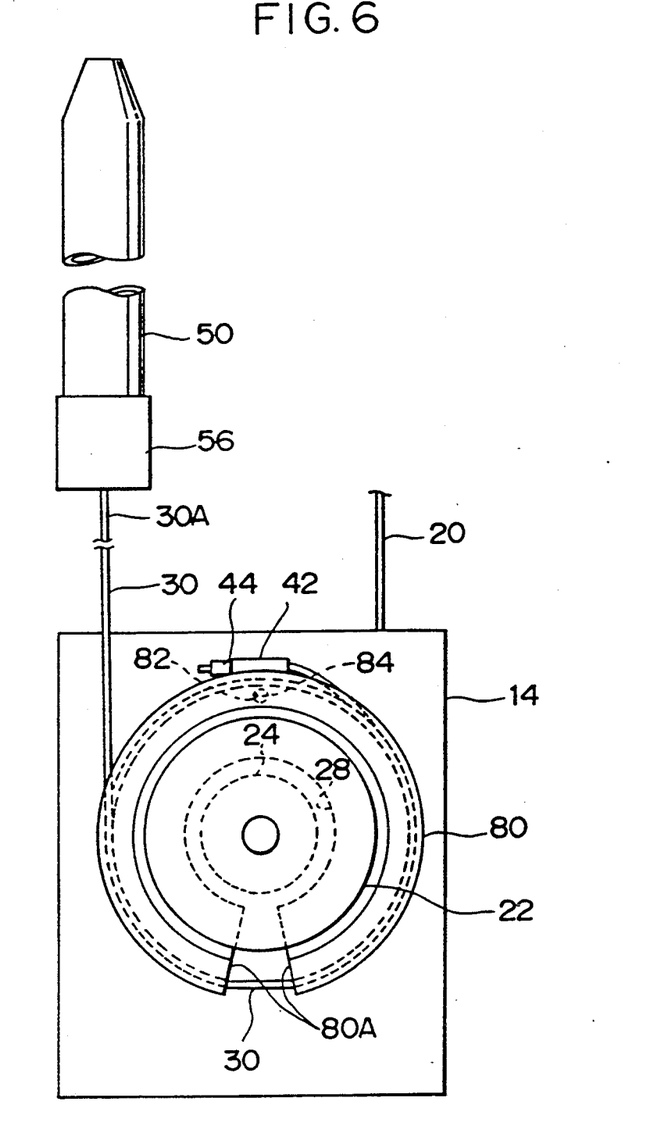
FIG. 6 is a cross-sectional view of the clutch mechanism of the preloader in accordance with a second embodiment of the present invention in the normal running state of the vehicle.

FIG. 6 illustrates a second embodiment of the present invention.

A wedge member 80 in accordance with the second embodiment is not divided into three segments in the manner of the wedge assembly of the first embodiment, but is integrally formed into a substantially C-shaped configuration in which a portion of a ring is cut off to expose lower ends 80A of the wedge member 80, so as to make the wedge member 80 resiliently deformable by means of the tight winding force of the wire 30 wound around the outer peripheral portion thereof. A circular hole 82 is provided in a side surface of the wedge member 80, a shear pin 84 formed on the leg plate 14 is fitted therein, and the wedge member 80 is secured to the leg plate 14.

When a tensile force acts on the wire 30, portions of the wedge member 80 in the vicinity of the lower ends 80A undergo resilient deformation owing to the tight winding force of the wire 30. and the protrusion 28 is fitted to the annular groove 24. Then, if the wire 30 is wound more tightly around the wedge member 80. the shear pin 84 is sheared. and at the same time as the protrusion 28 of the wedge member 80 is fitted completely to the annular groove formed around the rotating drum 22, the rotating drum 22 starts to rotate integrally with the wedge member 80.

Thus, the wedge member 80 is deformed by the tight winding force of the wire 30, and after portions of the protrusion 28 in the vicinity of the lower ends 80A are fitted to the annular groove 24, the shear pin 84 is sheared. As a result, the wire 30 is prevented from loosening or slipping. so that the tensile force can be transmitted positively to the rotating drum 22.

It should be noted that another rupture or breaking member which undergoes breaking or rupture by a predetermined tensile force may be used instead of the aforementioned shear pin.

As described above, with the clutch mechanism of the preloader in accordance with the present invention, at the time of a sudden deceleration of the vehicle, after the wedge assembly or member around which the wire is wound is fitted positively with the rotating drum. the torque is transmitted to the rotating drum. Accordingly, the wire is prevented from loosening or slipping. and the retracting force of the preloader can be transmitted positively to the takeup shaft.

Furthermore, since the clutch mechanism does not use a latch member (pawl or the like) and a ratchet gear, there is no fear of the tooth of the latch member becoming broken.

What is claimed is:

1. A preloader for use in a webbing retractor for retracting an occupant-restraining webbing onto a webbing takeup shaft so as to allow the webbing to be applied to the occupant with appropriate tightness, comprising:

a frame for rotatably supporting said webbing retractor;

a rotating drum having an annular groove provided on a periphery thereof and connected to said webbing takeup shaft;

wedge means having surfaces capable of being frictionally wedge-fitted to said annular groove of said rotating drum disposed in spaced-apart relation with said rotating drum;

holding means supported on said frame and adapted to retain said wedge means in spaced-apart relation with said rotating drum and to hold said wedge means until a predetermined load is applied thereof; and a flexible elongated member wound around said wedge means and adapted to, at the time of sudden deceleration of the vehicle, cancel the holding by said holding means by applying a predetermined load to said holding means and to thereby cause said wedge means to be wedge-fitted to said rotating drum, whereby said wedge means is wedge-fitted to said rotating drum and rotates integrally therewith so as to forcibly rotate said webbing takeup shaft supported on said frame in a webbing taking-up direction.

2. A preloader according to claim 1, wherein said annular groove has a width which becomes gradually smaller from an outer periphery of said rotating drum toward an axis thereof, and said wedge means is fitted to said annular groove.

3. A preloader according to claim 2, wherein said rotating drum is coaxially connected to said webbing takeup shaft.

4. A preloader according to claim 1, wherein said wedge means includes a plurality of wedge members which are provided and are arranged in a circumferential direction, and said holding means is comprised of a plurality of holding members respectively provided in correspondence with said plurality of wedge members.

5. A preloader according to claim 4, wherein said wedge members have a substantially identical configuration and are arranged around said rotating drum at equal intervals.

6. A preloader according to claim 4, wherein at least one of said holding members has a greater cross-sectional area than the other holding members, and undergoes breaking on application thereto of a load greater than a load applied to the other holding members.

7. A preloader according to claim 4, wherein at least one of said holding members cancels a state of holding of said wedge member on application thereto of a load greater than the load applied to another of said wedge members by said flexible elongated member.

8. A preloader according to claim 4, wherein one of said plurality of wedge members has a retaining portion by which an end portion of said flexible elongated member is retained.

9. A preloader according to claim 4, wherein each of said holding members cancels the holding of said wedge member by being broken by a predetermined load applied by said flexible elongated member.

10. A preloader according to claim 1, wherein said wedge means is wedge-fitted to an annular groove of said rotating drum by undergoing resilient deformation.

11. A preloader according to claim 10, wherein a remaining portion of said wedge means exclusive of a portion thereof at which said wedge means is supported on said frame by said holding means undergoes resilient deformation and is wedge-fitted to said annular groove.

12. A preloader according to claim 10, wherein said wedge means has a retaining portion by which an end of said flexible elongated member is retained.

13. A preloader according to claim 10, wherein said wedge means is disposed around an outer periphery of said rotating drum and is formed into a substantially C-shaped configuration.

14. A preloader according to claim 13, wherein a longitudinally central portion of said wedge means is held by said holding means.

15. A preloader for use in a webbing retractor for retracting an occupant-restraining webbing onto a webbing takeup shaft so as to allow the webbing to be applied to the occupant with appropriate tightness, comprising:
a frame for rotatably supporting said webbing retractor;
a rotating drum connected to said webbing takeup shaft coaxially therewith and having an annular groove provided on a periphery thereof;
wedge means having surfaces capable of being frictionally wedge-fitted to said annular groove of said rotating drum, and disposed in spaced-apart relation with said rotating drum;
holding means supported on said frame and adapted to retain said wedge means in spaced apart relation with said rotating drum and to hold said wedge means until a predetermined load is applied thereto; and
a wire wound around said wedge means and adapted to, at the time of sudden deceleration of the vehicle, apply the load in the direction of a center of said rotating drum by being tightened around said wedge means and to cancel the holding by said holding means by causing said holding means to break, so as to cause said wedge means to be wedge-fitted to said rotating drum and rotate said wedge means and said rotating drum integrally in a webbing taking-up direction; and
driving means for imparting a tensile force to said wire at the time of the sudden deceleration of the vehicle.

16. A preloader according to claim 15, wherein said wedge means includes a plurality of wedge members which are provided and are arranged in a circumferential direction, and said holding means is comprised of a plurality of holding members provided in correspondence with said plurality of wedge members, respectively.

17. A preloader according to claim 16, wherein said wedge members have a substantially identical configuration and are arranged around said rotating drum at equal intervals.

18. A preloader according to claim 16, wherein at least one of said holding members has a greater cross-sectional area than the other holding members, and undergoes breaking on application thereto of a load greater than a load applied to the other holding members.

19. A preloader according to claim 16, wherein one of said holding members cancels a state of holding of said wedge members on application thereto of a load greater than the load applied by said wire.

20. A preloader according to claim 16, wherein one of said plurality of wedge members has a retaining portion for securing one end of said wire.

21. A preloader according to claim 15, wherein said wedge means has a substantially C-shaped configuration formed by cutting off one portion thereof, a longitudinally central portion of said wedge means is retained at said frame by said holding means, and said wedge means is wedge-fitted to said annular groove of said rotating drum by being tightened by said wire and undergoing resilient deformation.

22. A preloader according to claim 21, wherein a remaining portion of said wedge means exclusive of a portion thereof at which said wedge means is supported on said frame by said holding means undergoes resilient deformation and is wedge-fitted to said annular groove.

23. A preloader according to claim 21, wherein said wedge means has a retaining portion for securing one end of said wire.

24. A preloader for use in a webbing retractor for retracting an occupant-restraining webbing onto a webbing takeup shaft so as to allow the webbing to be applied to the occupant with appropriate tightness, comprising:
a frame for rotatably supporting said webbing retractor;
a rotating drum connected to said webbing takeup shaft coaxially therewith and having an annular groove;
wedge means disposed in a spaced-apart relation with said annular groove of said rotating drum in such a manner as to be capable of being wedge-fitted to said annular groove;

holding means including at least one shear pin supported on said frame and adapted to retain said wedge means at said frame in spaced-apart relation with said annular groove of said rotating drum and to hold said wedge means until a predetermined load is applied thereto; and a wire wound around said wedge means, having one end secured to said wedge means, and adapted to, at the time of a sudden deceleration of the vehicle, cause said shear pin to break by being tightened around said wedge means and cause said wedge means to be wedge fitted to said rotating drum, so as to forcibly rotate said wedge means and said rotating drum integrally in a webbing taking-up direction; and driving means for imparting a tensile force to said wire at the time of the sudden deceleration of the vehicle.

25. A preloader according to claim 24, wherein said annular groove of said rotating drum has a trapezoidal cross section.

26. A preloader according to claim 24, wherein said wedge means includes three wedge members which are provided and arranged circumferentially around said rotating drum at equal intervals, and said holding means includes a plurality of shear pins, and each of said wedge members is retained respectively by said shear pin.

27. A preloader according to claim 26, wherein one of said plurality of wedge members has a retaining portion of securing one end of said wire.

28. A preloader according to claim 26, wherein one of said shear pins has a greater cross-sectional area than the other shear pins so that said one of said shear pins will undergo breaking by being further tightened by said wire after the other shear pins have undergone breaking by being tightened by said wire.

29. A preloader according to claim 24, wherein said wedge means is comprised of one wedge member which has a substantially C-shaped configuration formed by cutting off one portion thereof, a longitudinally central portion of said wedge means is retained at said frame by said shear pin, and said wedge means has a retaining portion for securing one end of said wire and is wedge-fitted to said annular groove of said rotating drum by being tightened by said wire and undergoing resilient deformation.

30. A preloader according to claim 29, wherein a remaining portion of said wedge means exclusive of a portion thereof at which said wedge means is supported on said frame by said shear pin undergoes resilient deformation and is wedge-fitted to said annular groove.

* * * * *